United States Patent
He et al.

(10) Patent No.: US 11,098,874 B2
(45) Date of Patent: Aug. 24, 2021

(54) INDICATOR LIGHT

(71) Applicant: JIANGSU HAIHUA AUTO PARTS CO., LTD., Danyang (CN)

(72) Inventors: Yuncai He, Danyang (CN); Yuan Zhong, Danyang (CN); Junhua He, Danyang (CN)

(73) Assignee: JIANGSU HAIHUA AUTO PARTS CO., LTD., Danyang (CN)

( * ) Notice: Subject to any disclaimer, the term of this patent is extended or adjusted under 35 U.S.C. 154(b) by 0 days.

(21) Appl. No.: 16/749,165

(22) Filed: Jan. 22, 2020

(65) Prior Publication Data
US 2020/0336342 A1    Oct. 22, 2020

(30) Foreign Application Priority Data

Apr. 16, 2019    (CN) .......................... 201920517499.1

(51) Int. Cl.
| | |
|---|---|
| F21V 1/02 | (2006.01) |
| F21S 43/14 | (2018.01) |
| F21S 43/15 | (2018.01) |
| B60R 1/06 | (2006.01) |
| F21S 43/20 | (2018.01) |

(Continued)

(52) U.S. Cl.
CPC .............. F21V 1/02 (2013.01); B60Q 1/2665 (2013.01); B60Q 1/2696 (2013.01); B60R 1/06 (2013.01); F21S 43/14 (2018.01); F21S 43/15 (2018.01); F21S 43/26 (2018.01); F21V 13/04 (2013.01)

(58) Field of Classification Search
CPC ........... B60R 1/1207; B60R 2001/1215; F21V 7/04–09; F21S 43/20; F21S 43/30; F21S 43/31; F21S 43/40; F21S 43/14; F21S 43/15; F21S 3/20; F21S 3/30; F21S 3/31; F21S 3/40; B60Q 1/2665
See application file for complete search history.

(56) References Cited

U.S. PATENT DOCUMENTS 6,076,948 A * 6/2000 Bukosky ............ B60Q 1/2665
                                                              340/475
9,663,027 B2 * 5/2017 Hellin Navarro ....... F21S 43/14
(Continued)

FOREIGN PATENT DOCUMENTS

| CN | 105313788 A | * | 2/2016 |
| CN | 105329158 A | * | 2/2016 |
| CN | 209625718 U | * | 11/2019 |

*Primary Examiner* — Mariceli Santiago
(74) *Attorney, Agent, or Firm* — Bacon&Thomas,PLLC

(57) ABSTRACT

The present disclosure discloses an indicator light, and belongs to the technical field of automobile indicator lights. The indicator light comprises a mirror, wherein a protrusion is formed around the edge of the mirror such that the mirror surrounds a cavity with an opened bottom end, the mirror forms at least one paraboloid at a top end of the cavity, and multiple reflection pieces are uniformly arranged on the paraboloid; a lens, wherein the lens covers the mirror and seals the protrusion, and a surface of the lens has etched optical dermatoglyph or electrical discharge machining marks; and at least one light bead, which is arranged in the cavity. The light bead can provide light rays for the mirror and the lens, and its emitted light rays are emitted between the mirror and the lens to increase the utilization ratio of the light rays and improve the light emission uniformity.

9 Claims, 2 Drawing Sheets

(51) Int. Cl.
*B60Q 1/26* (2006.01)
*F21V 13/04* (2006.01)

(56) References Cited

U.S. PATENT DOCUMENTS

| | | | |
|---|---|---|---|
| 10,753,565 B1* | 8/2020 | Patel | F21S 41/336 |
| 2012/0182750 A1* | 7/2012 | Chung | F21S 41/143 |
| | | | 362/509 |
| 2020/0298763 A1* | 9/2020 | Huang | B60Q 1/2665 |

* cited by examiner

INDICATOR LIGHT

TECHNICAL FIELD

The present disclosure relates to an indicator light, and belongs to the technical field of automobile indicator lights.

BACKGROUND

An automobile rear-view mirror is mainly used for observing rear and side road conditions. To further display driving-related auxiliary information, some indicator lights are mounted on the rear-view mirror. The indicator light is used for intuitively displaying vehicle and road condition information by matching with an indication pattern displaying related information in use, and the indication pattern is manufactured by a light-transmittance material.

The indicator light generally utilizes a point light source. To achieve an objective that light rays emitted by the point light source turn into parallel light rays to pass through the indication pattern and then arrive in the human eyes, generally a convex lens needs to be arranged between the point light source and the indication pattern, and after the parallel light rays pass through the indication pattern, each portion of the indication pattern can relatively uniformly emit lights and display clearly; but the existing indicator light still has problems that light emission is nonuniform and sealing performance is insufficient.

SUMMARY

A technical problem to be solved by the present disclosure is to provide an indicator light, which solves the problems that the existing indicator light is nonuniform in light emission and insufficient in sealing performance.

The present disclosure adopts the following technical solution to solve the technical problem:

an indicator light, comprises:

a mirror, wherein a protrusion is formed around the edge of the mirror such that the mirror surrounds a cavity with an opened bottom end, the minor forms at least one paraboloid at a top end of the cavity, and multiple reflection pieces are uniformly arranged on the paraboloid;

a lens, wherein the lens covers the mirror and seals the protrusion, and a surface of the lens has etched optical dermatoglyph or electrical discharge machining marks; and at least one light bead, which is arranged in the cavity.

By adopting the above technical solution, the indicator light has the following reflection principle:

(1), light rays emitted by the light bead performs first reflection by the mirror and then enter the lens to perform second diffuse reflection;

(2). the light rays emitted by the light bead performs first compensatory reflection through the lens, then enter the mirror to perform second compensatory reflection, and finally enter the lens to perform third diffuse reflection; and (3), a plurality of light beads and a plurality of paraboloids having the reflection pieces match with each other to ensure that sufficient light rays are emitted in various directions, and the etched optical dermatoglyph or the electrical discharge machining marks on the surface of the lens ensure that light emission effects in the various directions are uniform and mild.

As a preferred example, the mirror forms three paraboloids at the top end of the cavity.

As a preferred example, the reflection piece is a square reflection piece.

As a preferred example, the number of the light beads is three.

As a preferred example, slots are arranged in an inner side wall of the protrusion, an insert plate is inserted in the slots, and the light bead is fixed to the insert plate.

As a preferred example, a light emission angle of the light bead is 120 degrees or 60 degrees.

As a preferred example, a welding rib is arranged around the lens, and the lens is in welding seal with the mirror through the welding rib.

The present disclosure has the beneficial effects:

1, the light bead can provide light rays for the mirror and the lens, and its emitted light rays are emitted between the mirror and the lens to increase the utilization ratio of the light rays and finally emitted out through the lens having the etched optical dermatoglyph or the electrical discharge machining marks to improve the light emission uniformity; and 2, the lens covers the mirror and seals the mirror so as to improve the sealing performance, and the sealing performance of the indicator light can be detected by an airtight device to improve the use reliability of indicator light.

Figure 1:
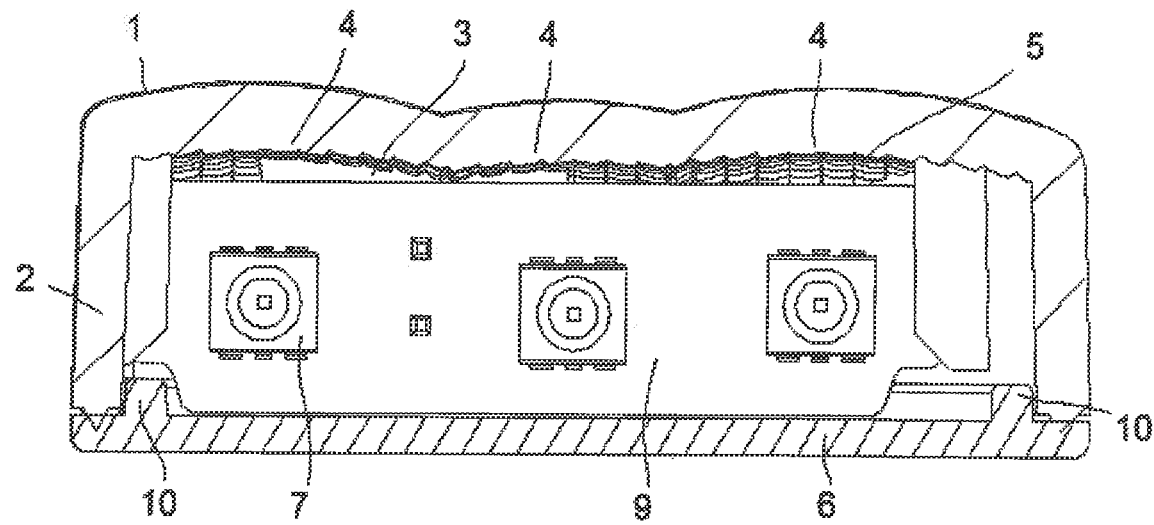
FIG. 1 is a schematic structural diagram of the present disclosure.

In the drawings: 1-minor, 2-protrusion, 3-cavity, 4-paraboloid, 5-reflection piece, 6-lens, 7-light bead, 8-slot, 9-insert plate, and 10-welding rib.

DESCRIPTION OF THE EMBODIMENTS

To make technical means, creation features, objectives, and effects of the present disclosure clearer and more comprehensible, the present disclosure is further described below with reference to the specific drawings.

Figure 2:
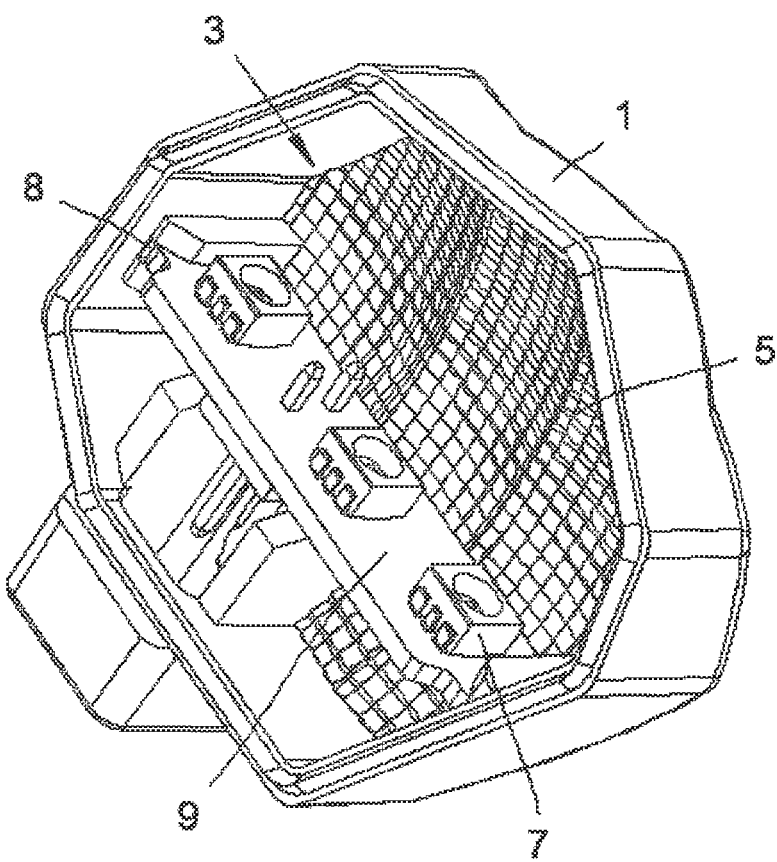
FIG. 2 is a schematic structural diagram of the present disclosure in another view.
Figure 3:
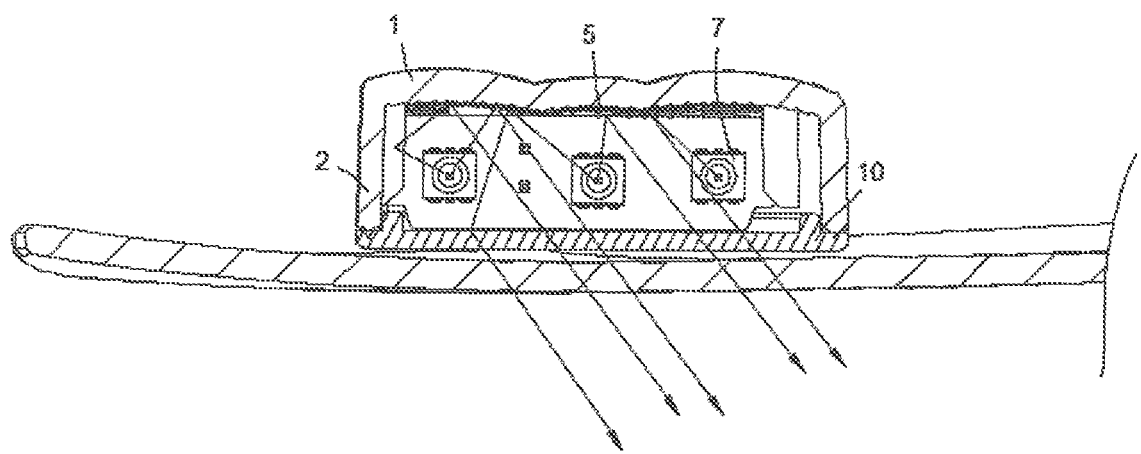
FIG. 3 is an optical path diagram of the present disclosure.

As shown in FIG. 1., FIG. 2 and. FIG. 3, an indicator light comprises:

a mirror 1, wherein a protrusion 2 is formed around the edge of the mirror 1 such that the mirror 1 surrounds a cavity 3 with an opened bottom end, the mirror 1 forms at least one paraboloid 4 at a top end of the cavity 3, and multiple reflection pieces 5 are uniformly arranged on the paraboloid 4;

a lens 6, wherein the lens 6 covers the mirror 1 and seals the protrusion 2, and a surface of the lens 6 has etched optical dermatoglyph or electrical discharge machining marks; and at least one light bead 7, which is arranged in the cavity.

In one embodiment, the mirror 1 forms three paraboloids 4 at the top end of the cavity 3.

According to actual demands, other numbers of the paraboloids 4 can also be formed, and optimally three paraboloids 4 are formed.

In one embodiment, the reflection piece 5 is a square reflection piece 5.

In one embodiment, the number of the light beads 7 is three.

According to actual demands, other numbers of the light beads 7 can be provided, optimally one to three light beads 7 are provided, and the light beads 7 can utilize LED lights.

In one embodiment, slots 8 are arranged on an inner side wall of the protrusion 2, an insert plate 9 is inserted in the slots 8, and the light bead 7 is fixed to the insert plate 9.

Further, a light emission angle of the light bead 7 is 120 degrees or 60 degrees.

In one embodiment, a welding rib 10 is arranged around the lens 6, and the lens 6 is in welding seal with the mirror .1 through the welding rib 10 in an ultrasonic welding manner.

Due to the present disclosure, 1, the light bead 7 can provide light rays for the mirror 1 and the lens 6, and its emitted light rays are emitted between the mirror 1 and the lens 6 to increase the utilization ratio of the light rays and finally emitted out through the lens 6 having the etched optical dermatoglyph or the electrical discharge machining marks to improve the light emission uniformity; and 2, the lens 6 covers the mirror 1 and seals the mirror 1 so as to improve the sealing performance, and the sealing performance of the indicator light can be detected by an airtight device to improve the use reliability of indicator light.

The foregoing displays and describes the basic principles, the main features and the advantages of the present disclosure, Persons skilled in the art should know that the present disclosure is not limited by the above embodiments. The above embodiments and the specification merely describe the principle of the present disclosure. The present disclosure further has various changes and improvements without departing from the principle of the present disclosure, and these changes and improvements should fall in the protection scope of the present disclosure. The protection scope of the present disclosure is limited by the appended claims and their legal equivalents.

What is claimed is:

1. An indicator light, comprising:
    a minor, wherein a protrusion is formed around the edge of the minor such that the minor surrounds a cavity with an opened bottom end, the minor forms at least one paraboloid at a top end of the cavity, and multiple reflection pieces are uniformly arranged on the paraboloid;
    a lens, wherein the lens covers the mirror and seals the protrusion, and a surface of the lens has etched optical dermatoglyph or electrical discharge machining marks; and
    at least one light bead, which is arranged in the cavity.

2. The indicator light according to claim 1, wherein the mirror forms three paraboloids at the top end of the cavity.

3. The indicator light according to claim 1, wherein the reflection piece is a square reflection piece.

4. The indicator light according to claim 1, wherein the number of the light beads is three.

5. The indicator light according to claim 1, wherein slots are arranged in an inner side wall of the protrusion, an insert plate is inserted in the slots, and the light bead is fixed to the insert plate.

6. The indicator light according to claim 1, wherein a light emission angle of the light bead is 120 degrees or 60 degrees.

7. The indicator light according to claim 1, wherein a welding rib is arranged around the lens, and the lens is in welding seal with the mirror through the welding rib.

8. The indicator light according to claim 4, wherein a light emission angle of the light bead is 120 degrees or 60 degrees.

9. The indicator light according to claim 5, wherein a light emission angle of the light bead is 120 degrees or 60 degrees.

* * * * *